(12) United States Patent
Jang et al.

(10) Patent No.: US 9,185,638 B2
(45) Date of Patent: Nov. 10, 2015

(54) METHOD AND APPARATUS FOR SELECTING NEIGHBOR CELLS IN MOBILE COMMUNICATION SYSTEM

(71) Applicant: Samsung Electronics Co. Ltd.

(72) Inventors: Jaehyuk Jang, Suwon-si (KR); Soenghun Kim, Yongin-si (KR); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/644,652

(22) Filed: Oct. 4, 2012

(65) Prior Publication Data

US 2013/0089029 A1     Apr. 11, 2013

Related U.S. Application Data

(60) Provisional application No. 61/543,475, filed on Oct. 5, 2011, provisional application No. 61/545,363, filed on Oct. 10, 2011.

(51) Int. Cl.
*H04Q 7/00* (2006.01)
*H04W 48/16* (2009.01)
*H04W 84/04* (2009.01)

(52) U.S. Cl.
CPC ............ *H04W 48/16* (2013.01); *H04W 84/045* (2013.01)

(58) Field of Classification Search
USPC .......................... 370/328, 252; 455/434, 444
See application file for complete search history.

(56) References Cited

U.S. PATENT DOCUMENTS

| | | | |
|---|---|---|---|
| 8,467,793 B2 * | 6/2013 | Dalsgaard et al. | 455/444 |
| 2010/0197310 A1 * | 8/2010 | Jung et al. | 455/436 |
| 2011/0098046 A1 | 4/2011 | Shin | |
| 2011/0105123 A1 * | 5/2011 | Lee et al. | 455/436 |
| 2011/0124334 A1 | 5/2011 | Brisebois et al. | |
| 2013/0023267 A1 * | 1/2013 | Ong et al. | 455/435.1 |

* cited by examiner

*Primary Examiner* — Duc C Ho
(74) *Attorney, Agent, or Firm* — Jefferson IP Law, LLP

(57) ABSTRACT

A neighbor cell search method and apparatus of a User Equipment (UE) is provided for performing the cell search procedure with the utilization of a Physical Cell Identity (PCI) list of PCIs used by evolved Node Bs (eNBs) for a Closed Subscriber Group (CSG) which is from an eNB in a Long Term Evolution (LTE) system. The cell search method includes selecting a cell of a base station, receiving system information including a Physical Cell Identity (PCI) list used by neighbor Closed Subscribed Group (CSG) cells of the base station, determining whether the terminal is in an any cell selection state for selecting any cell, and searching, when the terminal is in the any cell selection state, neighbor cells without application of the PCI list. The cell search method and apparatus are capable of performing the cell search procedure to appropriate eNBs, resulting in improvement of network attachment efficiency.

12 Claims, 10 Drawing Sheets

METHOD AND APPARATUS FOR SELECTING NEIGHBOR CELLS IN MOBILE COMMUNICATION SYSTEM

CROSS-REFERENCE TO RELATED APPLICATIONS

This application claims the benefit under 35 U.S.C. §119 (e) of a U.S. Provisional application filed on Oct. 5, 2011 in the U.S. Patent and Trademark Office and assigned Ser. No. 61/543,475, and a U.S. Provisional application filed on Oct. 10, 2011 in the U.S. Patent and Trademark Office and assigned Ser. No. 61/545,363, the entire disclosure of each of which is hereby incorporated by reference.

BACKGROUND OF THE INVENTION

1. Field of the Invention

The present invention relates to a mobile communication system. More particularly, the present invention relates to a neighbor cell search method and apparatus of a User Equipment (UE) with the utilization of a Physical Cell Identity (PCI) list of PCIs used by evolved Node Bs (eNBs) for a Closed Subscriber Group (CSG) which is from an eNB in a Long Term Evolution (LTE) system.

2. Description of the Related Art

With the rapid advances of technologies, mobile communication systems have evolved to the 4th Generation (4G) system represented by Long Term Evolution (LTE). LTE has been designed to work under the assumption of various scenarios such as by taking notice of various base station capabilities. For example, LTE has introduced a concept of Closed Subscriber Group (CSG) in which only terminals belonging to a CSG are entitled to access a corresponding CSG cell.

FIG. 1 is a diagram illustrating an architecture of an LTE system according to the related art.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to legacy node Bs of a Universal Mobile Communications System (UMTS). The eNBs 105, 110, 115, and 120 allow the UE to establish a radio link and are responsible for complicated functions as compared to the legacy node Bs. In the LTE system, all user traffic including real time services such as Voice over Internet Protocol (VoIP) are provided through a shared channel and thus there is a need for a device which is located in the eNB to schedule data based on the state information such as UE buffer conditions, power headroom state, and channel state. Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for various control functions and connected to a plurality of eNBs 105, 110, 115, and 120.

FIG. 2 is a diagram illustrating a protocol stack of the LTE system according to the related art.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK information corresponding to an uplink transmission is transmitted through Physical Hybrid-ARQ Indicator Channel (PHICH), and the uplink HARQ ACK/NACK information corresponding to a downlink transmission can be transmitted through Physical Uplink Control Channel (PUCCH) or Physical Uplink Shared Channel (PUSCH).

A UE can be in one of two states: a connected mode and an idle mode.

Meanwhile, an eNB can be categorized into one of the following types: an acceptable cell, a suitable cell, a barred cell, and a reserved cell. An acceptable cell corresponds to a cell allowing for limited services (emergency call and ETWS), and a cell not barred and satisfying cell selection conditions. A suitable cell corresponds to a cell providing UE with normal service, a cell which is part of selected/registered Public Land Mobile Network (PLMN) or PLMN of the equivalent PLMN list, for a CSG cell, CSG ID broadcast by cell is present in CSG white list, and a cell not barred and satisfying cell selection conditions. A barred cell corresponds to a cell indicated as barred cell in system information. A reserved cell corresponds to a cell indicated as reserved cell in system information.

The UE in the idle mode can be in one of several states according to the type of cell it search for or camps on. For example, when the UE is in the idle mode, the UE may be in a camped normally state, a cell selection when leaving RRC_Connected state, an any cell selection state, and a camped on any cell state.

The camped normally state corresponds to a state in which a suitable cell is found through the cell selection/reselection procedure. In this state, the UE monitors the paging channel to determine whether there is new data to be received from the network and receives system information. The UE also performs measurement for cell reselection and executes a cell reselection procedure.

The cell Selection when leaving RRC_Connected state corresponds to a state in which the UE attempts to search for a suitable cell when it transitions from RRC_CONNECTED state to the RRC_IDLE state.

The any cell selection state corresponds to a state in which the UE attempts to find an acceptable cell of any PLMN when it fails finding a 'suitable cell' or is rejected by the selected PLMN, the UE attempts to find an acceptable cell of any PLMN in this state. When an acceptable cell is found, the UE transitions to the 'Camped on any cell state.'

The camped on any cell state corresponds to a state in which the UE monitors paging channel to determine whether there is new data to be received from the network and receives system information. The UE also performs measurement for cell reselection and executes cell reselection procedure according to conditions. The UE also perform cell search for adjacent suitable cell.

The UE in idle mode receives system information broadcast by the eNB to acquire the information about the neighbor eNBs. The eNB (hereinafter, interchangeably used with the term 'macro eNB') notifies the UEs of the Physical Cell Identifier (PCI) list used by the CSG eNBs through System Information Block (SIB) 4. The PCI list is notified by means of the parameter csg-PhysCellIdRange and, once the csg-PhysCellIdRange is received, the UE camped on a cell of the PLMN assumes that the PCI list is value for 24 hours. If the UE is not a member of the CSG cell for this duration, the cells using the corresponding PCI is ruled out in the cell selection/reselection procedure.

However, the method according to the related art has a drawback in that the PCI used by the CSG eNBs is always ruled out in the cell search (selection/reselection) so as to disturb efficient cell search of the UE.

Therefore, a need exists for a cell search method and apparatus of a UE that is capable of facilitating cell search procedure based on the PCI list used by the CSG cells in adaptation to the UE status.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a cell search method and apparatus of a User Equipment (UE) that is capable of facilitating cell search procedure based on the Physical Cell Identifier (PCI) list used by the Closed Subscriber Group (CSG) cells in adaptation to the UE status.

Another aspect of the present invention is to provide a method for use of the PCI list of CSG cells this is transmitted by an evolved Node B (eNB) as follows.

Unlike the normal situation in which the cell reselection procedure is performed with the PCI list information used by the CSG cells, if it is in an any cell selection state (e.g., state allowing for only the emergency service), the UE perform the cell reselection procedure to all cells including the CSG cells indicated by the PCI list information (nullification or removal).

The UE determines whether the Primary Public Land Mobile Network (PLMN) is changed and, if so, includes the cells included in the PCI list information used by the CSG cells (nullification or removal) in the cell reselection procedure. Conversely, if the Primary PLMN is not changed, the UE performs the cell reselection procedure with the application of the PCI list used by the CSG cells.

When the Primary PLMN is changed, if new PCI list information used by the CSG cells is received the cell, the cell reselection is performed with the application of the corresponding application.

In accordance with an aspect of the present invention, a cell search method of a terminal in a mobile communication system is provided. The cell search method includes selecting a cell of a base station, receiving a system information including a Physical Cell Identity (PCI) list used by neighbor Closed Subscribed Group (CSG) cells of the base station, determining whether the terminal is in any cell selection state for selecting any cell, and searching, when the terminal is in the any cell selection state, neighbor cells without application of the PCI list.

In accordance with another aspect of the present invention, a terminal for searching neighbor cells in a mobile communication system is provided. The terminal includes a transceiver for transmitting and receiving signals to and from a base station, and a controller for selecting a cell of a base station, for receiving system information including a Physical Cell Identity (PCI) list used by neighbor Closed Subscribed Group (CSG) cells of the base station, for determining whether the terminal is in an any cell selection state for selecting any cell, and for searching, when the terminal is in the any cell selection state, neighbor cells without application of the PCI list.

In accordance with another aspect of the present invention, a neighbor cell search method of a terminal in a mobile communication system is provided. The neighbor cell search method includes selecting a cell of a first base station, determining, when first system information is received, whether a network operator is changed, and searching, when the network operator is changed, neighbor cells without application of Physical Cell Identity (PCI) list received from other base station than the first base station.

In accordance with still another aspect of the present invention, a terminal for searching neighbor cells in a mobile communication system is provided. The terminal includes a transceiver for transmitting and receiving signals to and from a base station, and a controller for selecting a cell of a first base station, for determining, when a first system information is received, whether a network operator is changed, and for searching, when the network operator is changed, neighbor cells without application of Physical Cell Identity (PCI) list received from other base station than the first base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As aforementioned, only a Closed Subscriber Group (CSG) member User Equipments (UEs) are allowed to access a CSG cells and thus there is a need for a non-CSG member UE to rule out the CSG cells in the cell selection procedure. In the current Long Term Evolution (LTE) standard, a Physical Cell Identity (PCI) list for CSG cells is transmitted from a micro evolved Node B (eNB) to the UE such that the UE searches for neighbor cells with the exception of the CSG cells using the PCI.

However, the PCI list used by the CSG cells can be changed according to the change of the provider's policy or there can be a special situation requiring attempt to the CSG cell (e.g. there is no cell for the UE to be able to access). However, the current technology does not provide any method for coping with such a situation and thus there is a need for a method to overcome this problem.

Figure 1:
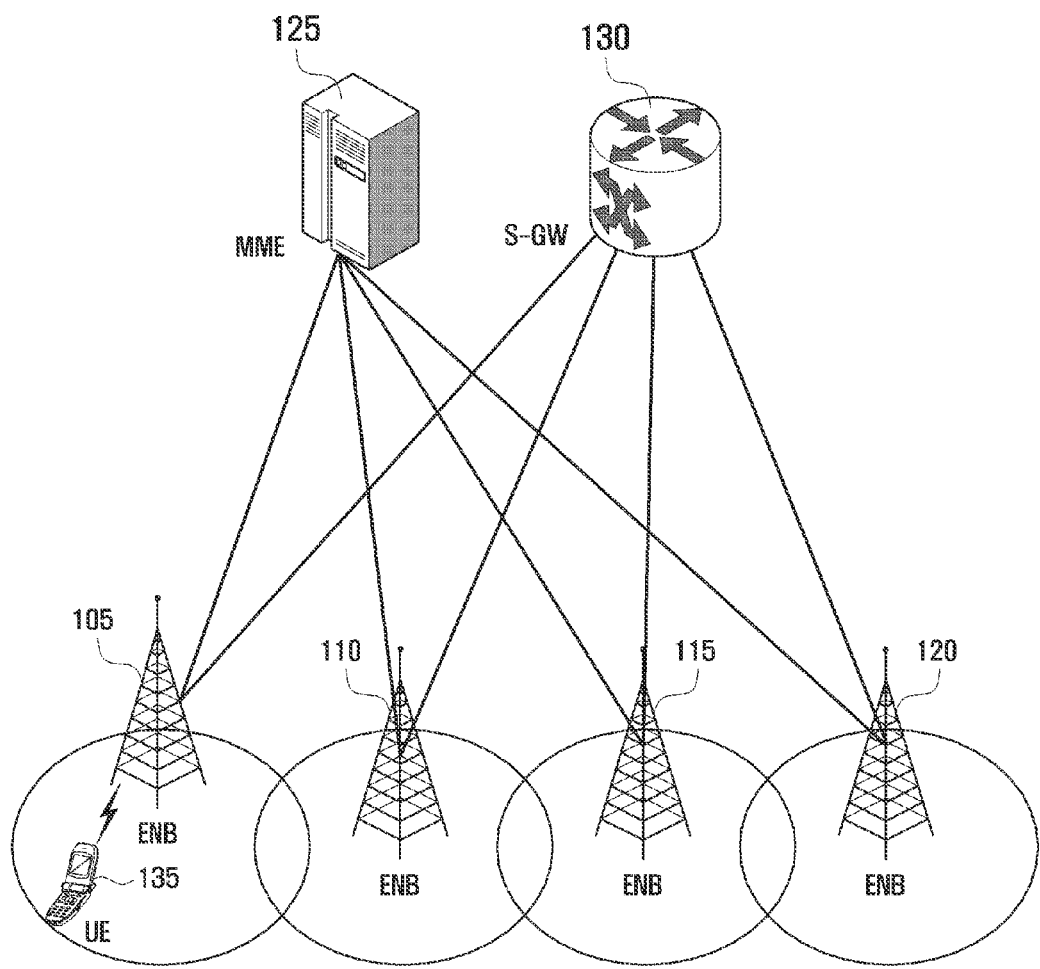
FIG. 1 is a diagram illustrating an architecture of a Long Term Evolution (LTE) system according to the related art.
Figure 2:
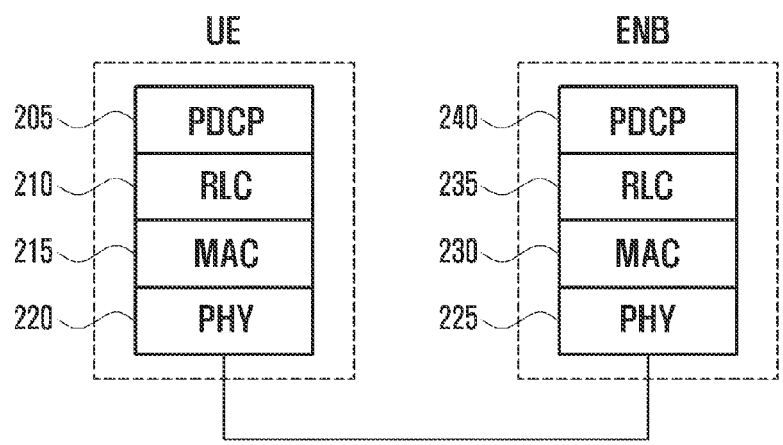
FIG. 2 is a diagram illustrating a protocol stack of an LTE system according to the related art.
Figure 3:
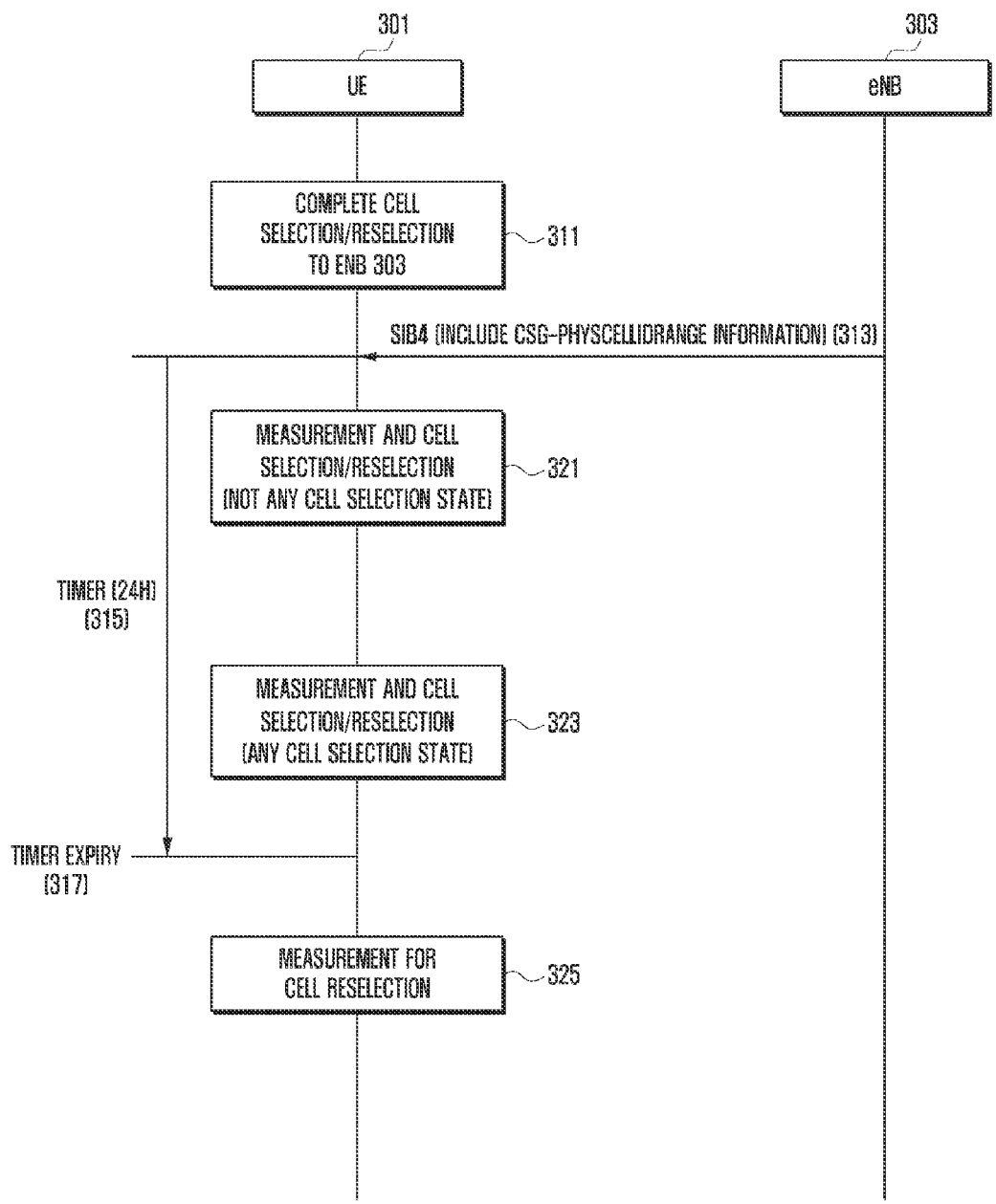
FIG. 3 is a signaling diagram illustrating a Physical Cell Identity (PCI) list-assisted cell search procedure of a User Equipment (UE) according to an exemplary embodiment of the present invention.

FIG. 3 is a signaling diagram illustrating a PCI list-assisted cell search procedure of the UE according to an exemplary embodiment of the present invention. In order to help understand exemplary embodiments of the present invention, it is assumed that the UE 301 has completed cell selection/reselection to the eNB 303.

Referring to FIG. 3, the UE 301 in idle mode completes the cell selection/reselection to the eNB 303 at step 311. Thereafter, the UE 301 receives the System Information Block (SIB) 4 from the eNB 303 and extracts PCI list used by the neighbor CSG cell from the SIB 4 at step 313. The PCI list used by the neighbor CSG cells is included in the csg-PhysCellIdRange field.

If the csg-PhysCellIdRange field is received, then the UE 301 starts a timer set to a first time duration (e.g., 24 hours) at step 315. While the timer operates, the UE 301 regards that the PCI list used by the neighbor CSG cells which has been received from the eNB 303 is valid. In the case in which it measures the neighbor cells for neighbor cell selection/reselection, the UE performs measurement to the cells that are not included in the PIC list used by the neighbor CSG cells at step 321.

This operation causes no problem in the normal situations, (i.e., when there is a cell from which it is possible to receive the normal service). For example, in a case in which there is a suitable cell among the cells with the exception of the cells included in the csg-PhysCellIdRange, the UE 301 is capable of camping on the corresponding cell to receive the normal service.

However, if there is no suitable cell among the cells with the exception of the cells included in the csg-PhysCellIdRange, then the cell included in the previously received csg-PhysCellIdRange may be a macro cell rather than a CSG cell and it is preferred that even the emergency call is served by the cell having the best radio channel condition (although it is a CSG cell).

Accordingly, when the UE 301 is in an Any Cell Selection state (hereinafter, interchangeably used with the term 'first state') as the above-described state (e.g., when there is no adjacent suitable cell), the UE determines that the csg-PhysCellIdRange information included in the PCI list is invalid and thus measures neighbor cells including the cells in the csg-PhysCellIdRange to perform cell selection/reselection at step 323. For example, the UE 301 measures the neighbor cells that are not indicated in the PCI list in the above case.

If the timer 315 has expired at step 317, then the UE 301 determines that the previously received csg-PhysCellIdRange information is not valid any longer and measures the all neighbor cells including the CSG cells indicated in csg-PhysCellIdRange to perform cell selection/reselection at step 325.

Figure 4:
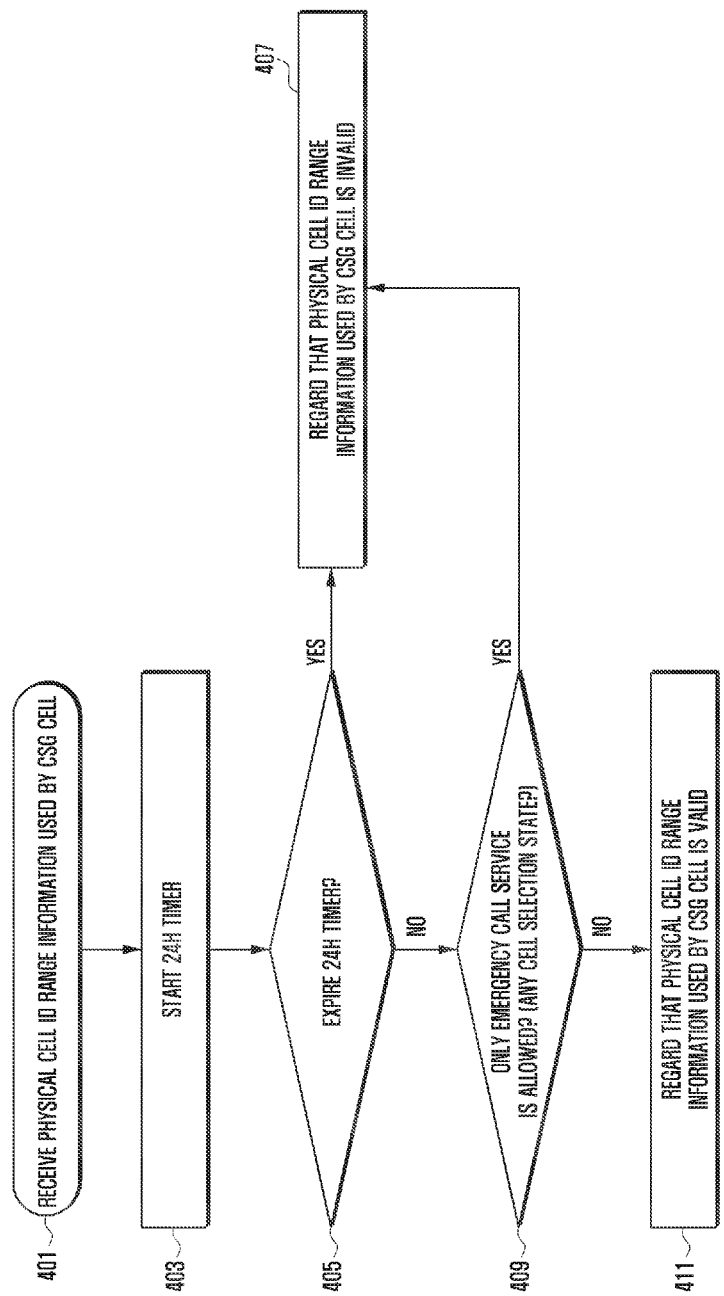
FIG. 4 is a flowchart illustrating a PCI list-assisted cell search procedure of a UE according to a first exemplary embodiment of the present invention.

FIG. 4 is a flowchart illustrating a PCI list-assisted cell search procedure of a UE according to a first exemplary embodiment of the present invention.

Referring to FIG. 4, the UE 301 receives a Physical Cell ID range information for used in CSG cells (i.e., PCI list in the SIB4 from the eNB 303 (e.g., macro eNB)) at step 401. Upon receipt of the PCI list, the UE 301 starts the timer having a length of the first time duration (e.g., 24 hours) at step 403.

At step 405, the UE 301 determines whether the timer has expired. If the timer is determined to have expired, then the UE 301 proceeds to step 407. In contrast, if the timer is determined to have not expired, then the UE 301 proceeds to step 409.

At step 409, the UE 301 determines whether the UE 301 is in the Any Cell Selection state.

Afterward, if the timer is running in the cell selection/reselection procedure and if the UE is not in the Any Cell Selection state in which no adjacent suitable cell exists, then the UE 301 regards that the information received at step 401 as valid and uses this information in the neighbor cell selection/reselection procedure at step 411. For example, if it does not belongs to any CSG cell, then the UE 301 performs cell selection/reselection procedure with the exception of the CSG cells indicated in the PCI list.

However, if the time has expired or if the UE is in the Any Cell Selection state having no suitable cells around although the timer has not expired, then the UE 301 regards that the information received at step 401 as invalid and thus rules out the Physical Cell id range (i.e., the PCI list) in the cell selection/reselection procedure. In other words, the UE 301 measures neighbor cells without consideration of the PCI list.

Figure 5:
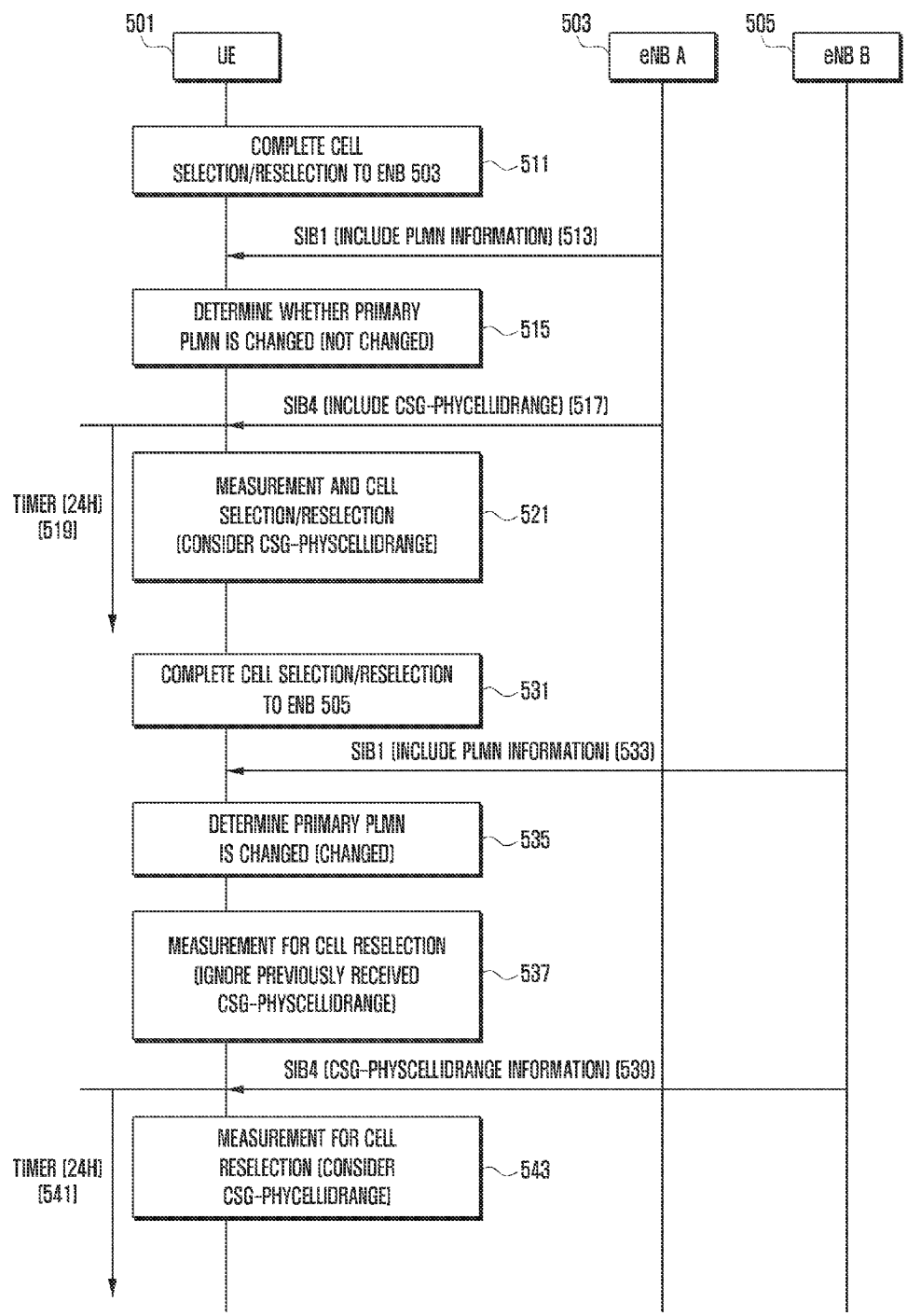
FIG. 5 is a signaling diagram illustrating a PCI list-assisted cell search procedure of a UE according to a second exemplary embodiment of the present invention.

FIG. 5 is a signaling diagram illustrating a PCI list-assisted cell search procedure of a UE according to a second exemplary embodiment of the present invention. In order to help understand an exemplary embodiment of the present invention, it is assumed that the UE is not the member of any CSG.

Referring to FIG. 5, the UE 501 in idle mode completes the cell selection/reselection to the eNB A 503 at step 511. Once the cell selection/reselection procedure has completed, the UE 501 receives an SIB 1 message from the eNB A 503 to acquire Public Land Mobile Network (PLMN) information of the eNB A 503 at step 513. The UE 501 compares the received PLMN information with the Primary PLMN information of the eNB to determine whether the PLMN is changed at step 515.

Upon receipt of the SIB 4 which includes csg-PhysCellIdRange information at step 517, if the PLMN is not changed, then the UE 501 starts a timer set to a first duration (e.g., 24 hours) at step 519. The SIB 4 information can be received from the other eNB to which the UE 501 has attached than eNB A 503 and, if the Primary PLMN has not been changed, then the timer started or restarted at the receipt of the SIB 4 is maintained with the validity of the csg-PhysCellIdRange information at step 521.

Afterward, the UE 501 performs cell reselection to the eNB B 505 according to the roaming or change of the radio channel condition at step 531. The UE 501 receives SIB 1 message from the newly selected eNB B 505 to acquire the PLMN information of eNB B 505 at step 533.

Next, the UE 501 compares the received PLMN information with the Primary PLMN of the old eNB to determine whether the PLMN is changed at step 535. If the PLMN is changed, then the UE 501 measures the neighbor cell at step 537 without consideration of the csg-PhysCellIdRange received at step 517. For example, the UE 501 performs neighbor cell measurement without application of the PCI list. However, if the csg-PhysCellIdRange is acquired from the SIB 4 received from the eNB B 505 at step 539, then the UE 501 performs measurement for cell selection/reselection in consideration of the newly received csg-PhysCellIdRange at step 543. For example, the UE 501 rules out the CSG cells indicated in the csg-PhysCellIdRange (or PCI list) in the measurement. The csg-PhysCellIdRange received at step 517 and the csg-PhysCellIdRange received at step 539 can be identical with or different from each other. Upon receipt of the SIB 4 which includes csg-PhysCellIdRange information at step 539, the UE 501 starts a timer set to a first duration (e.g., 24 hours) at step 541.

Figure 6:
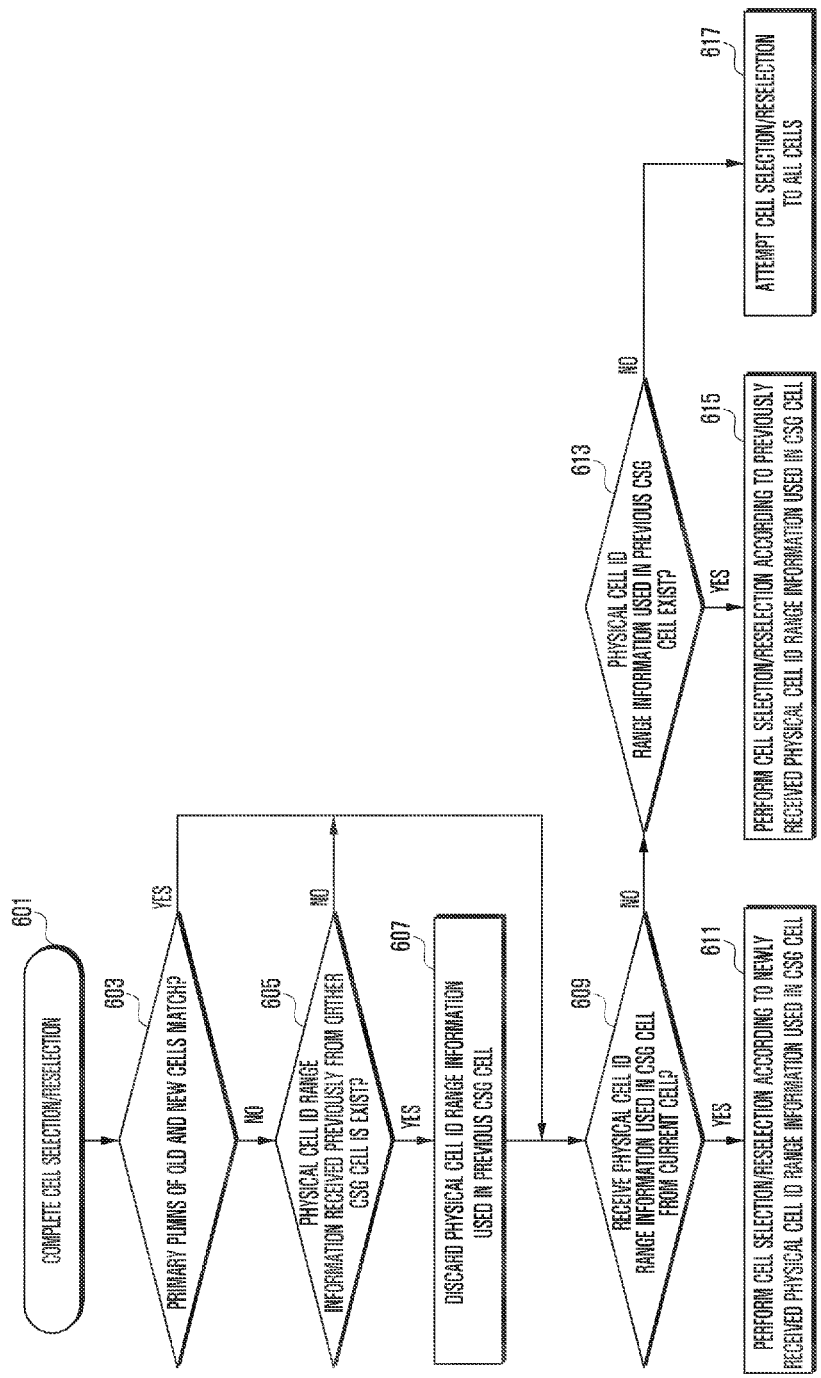
FIG. 6 is a flowchart illustrating a PCI list-assisted cell search procedure of a UE according to a second exemplary embodiment of the present invention.

FIG. 6 is a flowchart illustrating a PCI list-assisted cell search procedure of a UE according to a second exemplary embodiment of the present invention.

Referring to FIG. 6, the UE completes cell selection/reselection to a new cell at step 601. Once the cell selection/reselection to a new cell has completed at step 601, the UE 501 receives PLMN information in the SIB1 transmitted by the newly selected/reselected cell (e.g., eNB). Next, the UE 501 determines whether the PLMNs of the old cell (e.g., previously selected/reselected) and the new cell match with each other at step 603.

If the PLMNs are determined to not match with each other, the UE 501 determines whether the Physical Cell id range information received previously from other CSG cell exists at step 605. If the previously store Physical Cell id range information is determined to exist, the UE discards this information at step 607. In contrast, if the Physical Cell id range information received previously from other CSG cell is determined to not exist at step 605, then the procedure jumps to step 609. Similarly, if the PLMNs match with each other at step 603, the procedure jumps to step 609.

At step 609, the UE 501 determines whether new Physical Cell id range information on the CSG cell is received in the SIB4 transmitted by the newly selected/reselected cell. If new Physical Cell id range information is determined to have been received at step 609, the UE 501 uses the corresponding information in the cell selection/reselection procedure at step 611.

In contrast, if no new Physical Cell id range information is determined to have been received at step 609, the UE 501 determines whether the Physical Cell id range information of the old CSG cell is received at step 613. If the Physical Cell id range information of the old CSG cell is determined to have been received at step 613, the UE 501 performs the cell selection/reselection procedure with the old Physical Cell id range information at step 615. In contrast, if the Physical Cell id range information of the old CSG is determined to have not been received at step 613, then the UE 501 performs cell selection/reselection procedure to all cells at step 617.

Figure 7:
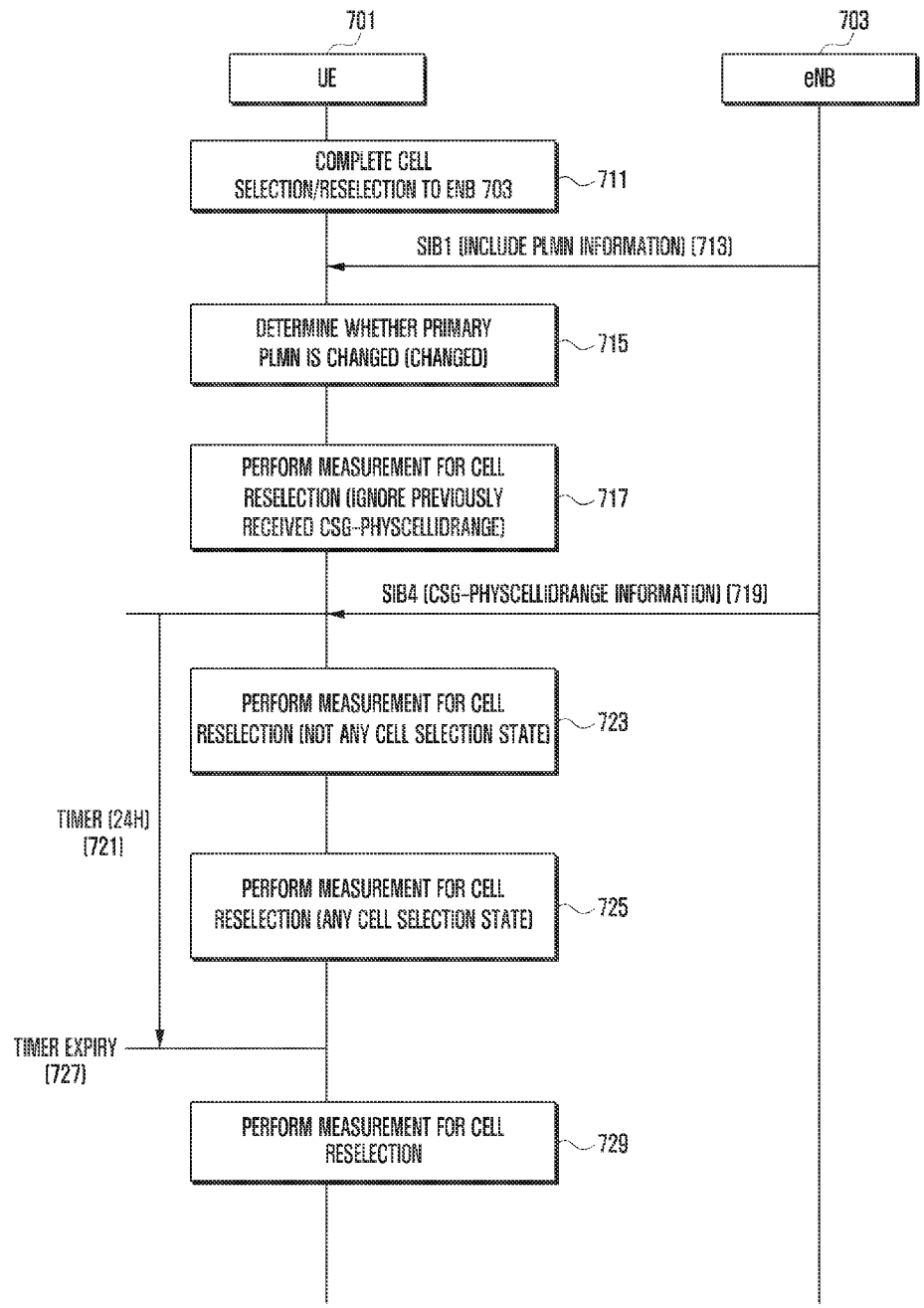
FIG. 7 is a signaling diagram illustrating a PCI list-assisted cell search procedure of a UE according to a third exemplary embodiment of the present invention.

FIG. 7 is a signaling diagram illustrating a PCI list-assisted cell search procedure of a UE according to a third exemplary embodiment of the present invention. In order to help understand the third exemplary embodiment of the present invention, it is assumed that the UE is not the member of any CSG.

Referring FIG. 7, the UE 701 in idle mode completes the cell selection/reselection to the eNB 703 at step 711.

After completing the cell selection/reselection, the UE 701 receives an SIB 1 message from the eNB 703 to acquire the PLMN information at step 713.

The UE 701 compares the received PLMN information and the Primary PLMN information of the old eNB to determine whether the PLMN is changed at step 715.

If the PLMN is changed, the UE 701 measures the neighbor cells without consideration of the csg-PhysCellIdRange information received from the old cell at step 717. For example, the UE 701 performs neighbor cell measurement without application of the PCI list. However, if the csg-PhysCellIdRange is received in the SIB4 from the eNB 703 afterward at step 719, the UE 701 performs measurement for cell selection/reselection in consideration of the newly received csg-PhysCellIdRange at step 723. For example, the UE 701 rules out the CSG cells indicated by the csg-PhysCellIdRange in the measurement.

If the csg-PhysCellIdRange is received, the UE 701 starts a timer having a length of the first time duration (e.g., 24 hours) at step 721. Until the timer expires at step 727, the PCI list used by the neighbor CSG cells is valid. Accordingly, when measuring the neighbor cells for cell selection/reselection, the UE 701 performs measurement to the cells that are not included in the PCI list at step 723.

This operation does not cause a problem when there is a cell providing the normal service. For example, if there is a suitable cell among the cells that are not indicated by the csg-PhysCellIdRange, the UE 701 camps on the corresponding cells to receive the normal service.

However, the cell indicated by the csg-PhysCellIdRange which has been received previously in the situation in which there is no suitable cell among the cells that are not indicated by the csg-PhysCellIdRange may be a normal macro cell and it is preferred that even the emergency call is served by the cell having the best radio channel condition (although it is a CSG cell).

In addition, at step 725, the UE 701 performs a measurement for cell selection/reselection when the UE is in an Any Cell Selection state.

Accordingly, when the UE is in the Any Cell Selection state as above described (e.g., when there is no suitable cell adjacent), the UE 701 determines the invalidity of the csg-PhysCellIdRange and performs measurement to the neighbor cells including the cells indicated by the csg-PhysCellIdRange for cell selection/reselection at step 729.

Figure 8:
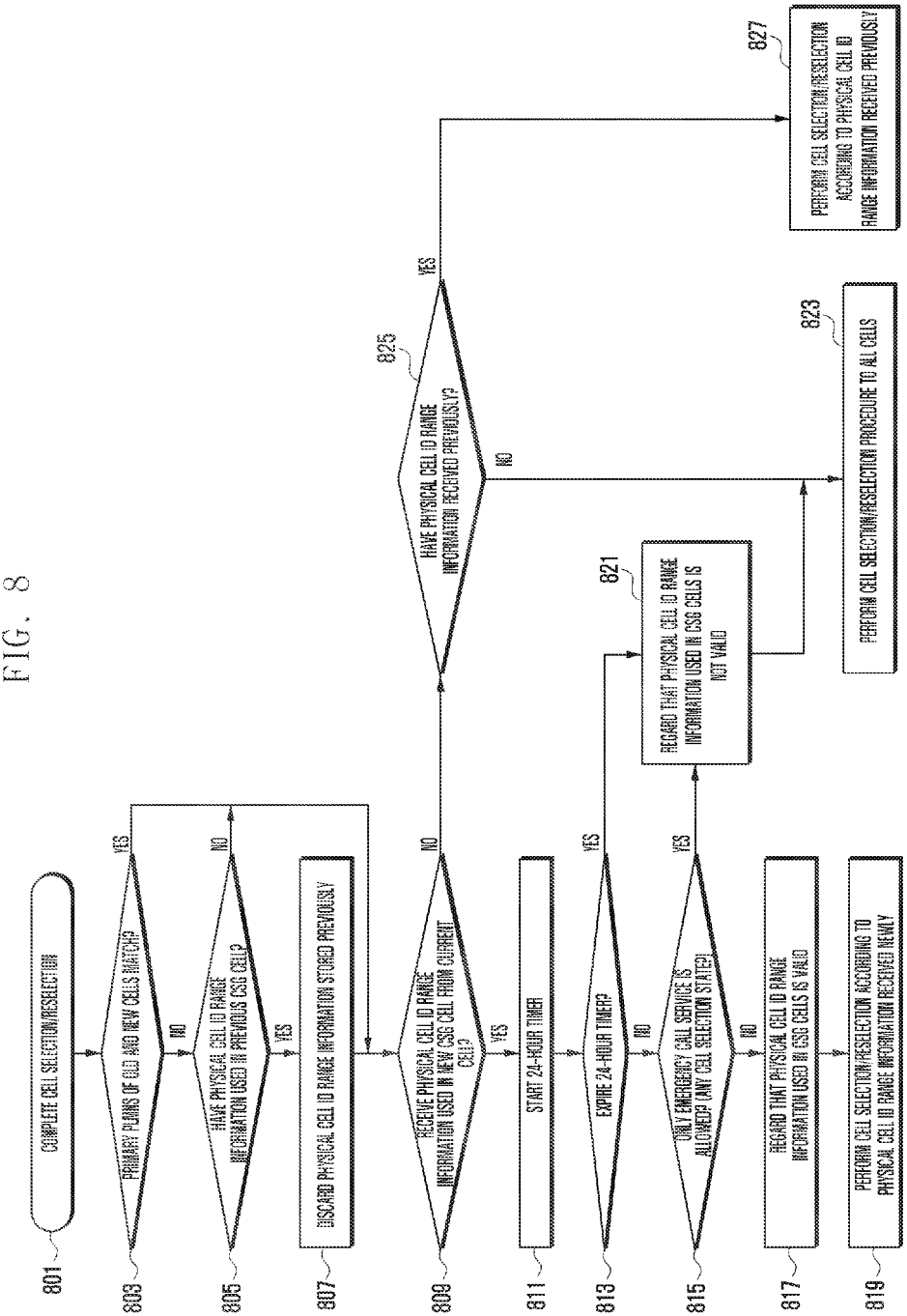
FIG. 8 is a flowchart illustrating a PCI list-assisted cell search procedure of the procedure of a UE according to the third exemplary embodiment of the present invention.

FIG. 8 is a flowchart illustrating a PCI list-assisted cell search procedure of the procedure of a UE according to a third exemplary embodiment of the present invention.

Referring to FIG. 8, the UE completes cell selection/reselection at step 801. After selecting/reselecting a new cell at step 801, the UE receives PLMN information in the SIB1 transmitted by the newly selected/reselected cell and determines whether the received PLMN information is identical with the Primary PLMN of the old cell at step 803.

If the PLMNs are determined to not match each other, the UE determines whether the Physical Cell id range information of CSG cells which has been received previously from other cell exists at step 805. If the Physical Cell id range information is determined to exist, the UE discards this Physical Cell id range information at step 807.

In contrast, if the UE determines that the Physical Cell id range information of CSG cells which has been received previously from other cell does not exist at step 805, then the procedure jumps to step 809. Similarly, if the PLMNs are determined to match each other at step 803, the procedure jumps to step 809.

The UE determines whether the Physical Cell id range information used in the CSG cells is received newly in the SIB4 from the newly selected/reselected cell at step 809. If the UE determines that the Physical Cell id range information used in the CSG cells is received newly in the SIB4 from the newly selected/reselected cell at step 809, then the UE starts a timer having the length of the first time duration (e.g., 24 hours) at step 811.

The UE determines whether the timer has expired at step 813. If the timer is determined to have not expired, the UE determines whether the UE is in a state capable of receiving emergency call service (e.g., the Any cell selection state) at step 815. If the UE is determined to not be in the Any Cell Selection state in which no adjacent suitable cell exists, the UE regards that the physical Cell id range information used in the CSG cells is valid at step 817. The UE then performs cell selection/reselection by referencing the newly received Physical Cell id range information afterward at step 819. For example, the CSG cells included in the received PCI list are ruled out in measurement.

However, if the timer is determined to have expired at step 813, if the timer has not expired but the UE is determined to be in the Any Cell Selection state in which no adjacent suitable cell exists at step 815, the UE regards at step 821 that the information received at step 809 is invalid. Thus the UE performs cell selection/reselection to all cells without consideration of the Physical Cell id range at step 823.

If the UE determines that no new Physical Cell id range information of CSG cells is received in SIB4 at step 809, the UE determines whether the old Physical Cell id range information of the CSG cells is received at step 825. If the old Physical Cell id range information is determined to have been received at step 825, the UE performs cell selection/reselection procedure with the old Physical Cell id range information at step 827. In contrast, if the old Physical Cell id range information is determined to have not been received at step 825, performs the cell selection/reselection procedure to all cells at step 823.

Figure 9:
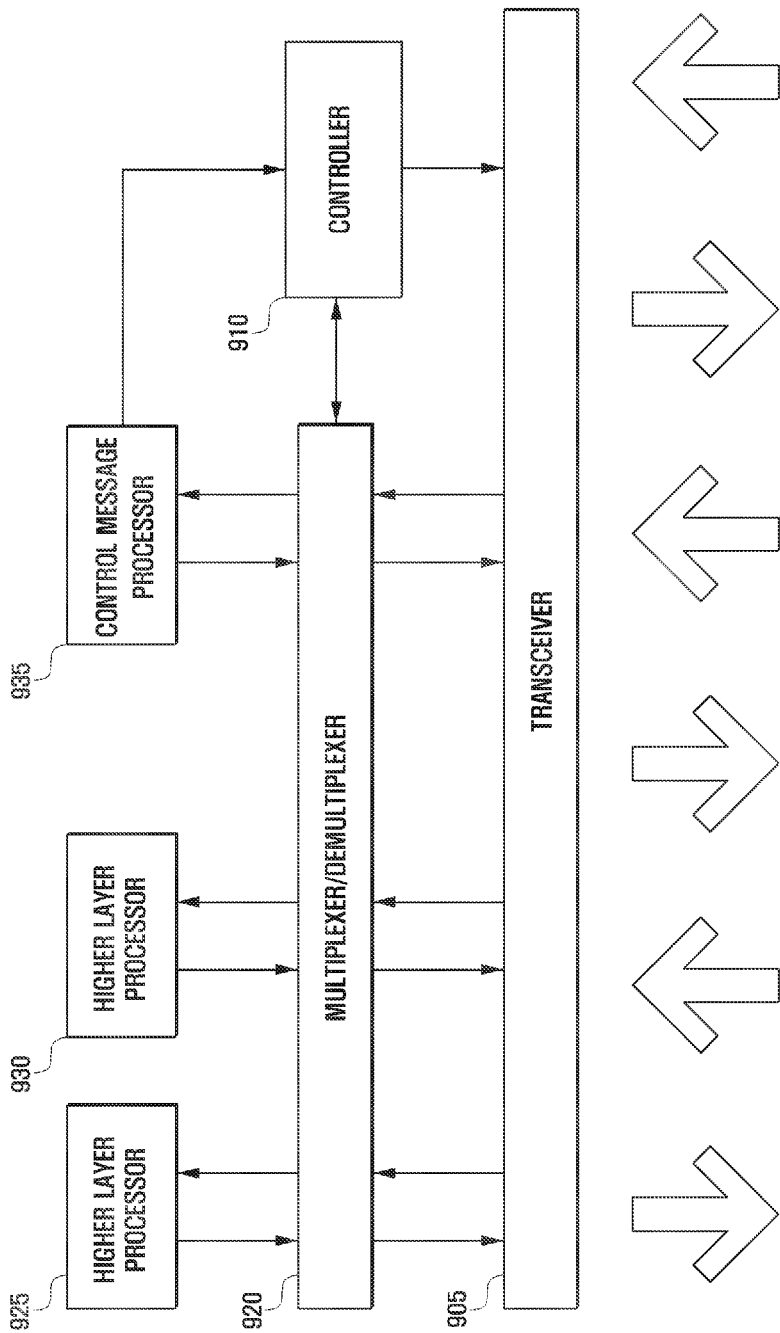
FIG. 9 is a block diagram illustrating a configuration of a UE according to an exemplary embodiment of the present invention.

FIG. 9 is a block diagram illustrating a configuration of a UE according to an exemplary embodiment of the present invention.

Referring to FIG. 9, the UE according to an exemplary embodiment of the present invention includes a transceiver 905, a controller 910, a multiplexer/demultiplexer 920, higher layer processors 925 and 930, and a control message processor 935.

The transceiver 905 receives data and control signals through a downlink channel of the serving cell and transmits data and control signal through an uplink channel. If multiple serving cells are configured, the transceiver 905 is capable of transmitting and receiving data and control signals through multiple serving cells.

The multiplexer/demultiplexer 920 multiplexes the data generated by the higher layer processor 925 and 930 and the control message processor 935, and demultiplexes the data received by the transceiver 905 to deliver the demultiplexed data to appropriate processors (e.g., the higher layer processors 925 and 930 and the control message processor 935).

The control message processor 935 processes the control message received from the eNB to take an appropriate action. For example, if DRX-related parameters are received, the control message processor 935 delivers these parameters to the controller 910.

The higher layer processors 925 or 930 are configured per service to process the data generated by a user service such as File Transfer Protocol (FTP) and Voice over Internet Protocol (VoIP) and to transfer the processed data to the multiplexer/demultiplexer 920 and to process the data from the multiplexer/demultiplexer 920 and to deliver the processed data to the service application running on the higher layer.

The controller 910 analyzes the scheduling command (e.g., uplink grant), received by the transceiver 905, and controls the transceiver 905 and the multiplexer/demultiplexer 920 to perform uplink transmission with appropriate transmission resource at appropriate timing. The controller 910 controls the transceiver 905 by taking notice of the DRX operation and CSI/SRS transmission.

According to an exemplary embodiment of the present invention, the controller 910 is capable of performing cell selection to a certain eNB. The controller controls receiving the system information including Physical Cell Identity (PCI) used by adjacent Closed Subscriber Group (CSG) from the eNB. The controller 910 determines whether the UE is in an Any Cell Selection state and, if so, controls the neighbor cell search without application of the received PCI list. In this case, if the UE performs neighbor cell search without application of the received PCI list, then the neighbor cell search is performed to all cells including the CSG cells included in the PCI list.

If the UE is not in the Any Cell Selection state, the controller 910 controls the neighbor cell search with application of the received PCI list. In this case, if the UE performs neighbor cell search with application of the received PCI list, this means that the neighbor cell search is performed to the cells with the exception of CSG cells included in the PCI list.

The controller 910 is also capable of starting a timer having the length of the first time duration after receipt of the system information and controlling the neighbor cell search with application of the PCI list before the timer expires.

According to another exemplary embodiment of the present invention, the controller 910 is capable of performing cell search to a certain first eNB. If the first system information is received from the first eNB, the controller 910 determines whether the PLMN is changed and, if so, controls the neighbor cell search without applying Physical Cell Identity (PCI) list received from the first eNB and other eNBs.

If the second system information including the PCI list used by the Closed Subscriber Group (CSG) cells which is transmitted by the first eNB is received, the controller 910 is capable of performing neighbor cell search with application of the PCI list included in the second system information.

Figure 10:
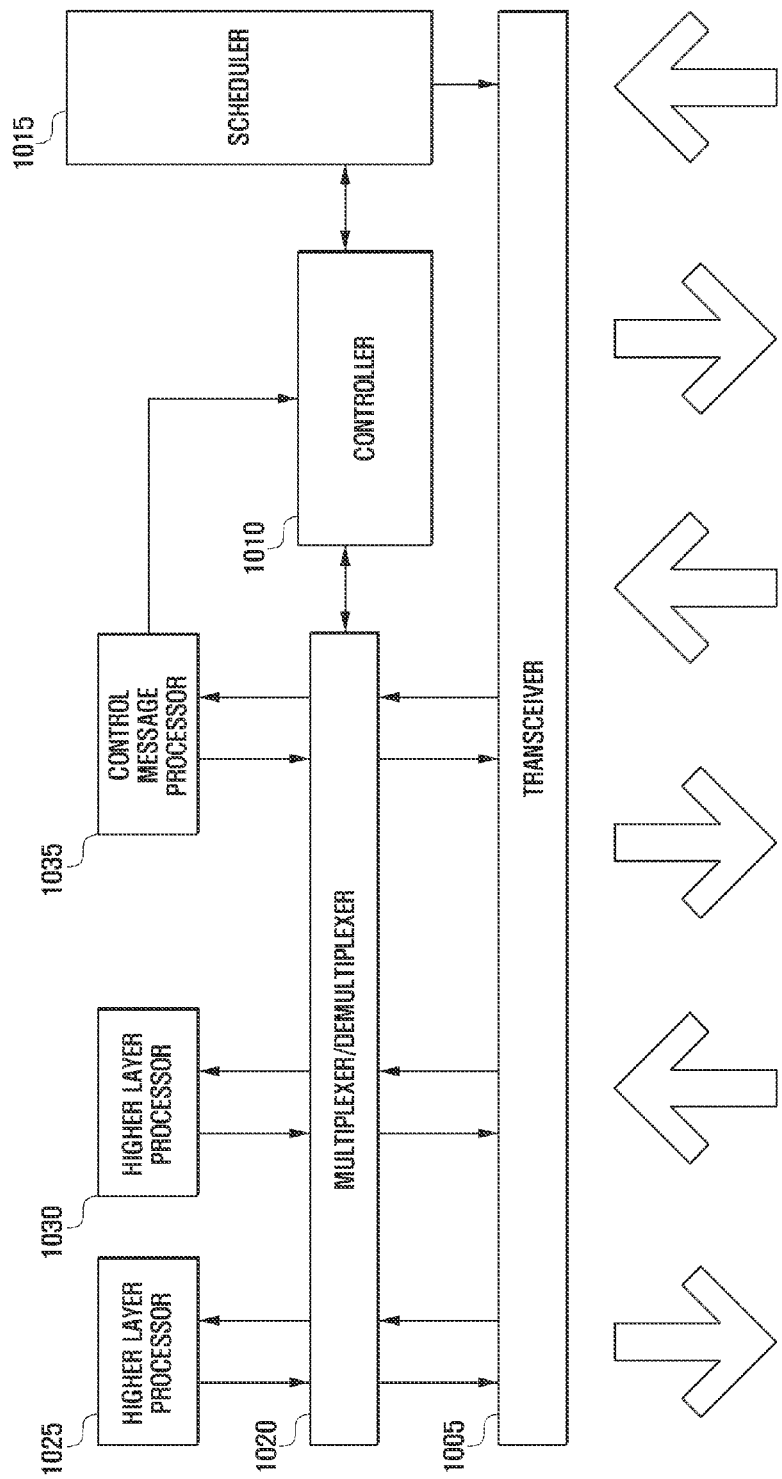
FIG. 10 is a block diagram illustrating a configuration of an evolved Node B (eNB) according to an exemplary embodiment of the present invention.

FIG. 10 is a block diagram illustrating a configuration of an eNB according to an exemplary embodiment of the present invention.

Referring to FIG. 10, the eNB includes a transceiver 1005, a controller 1010, a scheduler 1015, a multiplexer/demultiplexer 1020, various higher layer processors 1025 and 1030, and a control message processor 1035.

The transceiver 1005 transmits data and control signals on a downlink carrier and receives data and control signals on an uplink carrier. If multiple carriers are configured, the transceiver 1005 transmits and receives the data and control signals on the multiple carriers.

The multiplexer/demultiplexer 1020 multiplexes the data generated by the higher layer processors 1025 and 1030 and the control message processor 1035, and demultiplexes the data received by the transceiver 1005 to deliver the demultiplexed data to at least one of the higher layer processors 1025 and 1030, the control message processor 1035, and the controller 1010. The control message processor 1035 processes the message transmitted by the UE and takes a necessary action or generates a control message to be transmitted to the UE to the higher layer.

The higher layer processors 1025 or 1030 are configured per UE per service to process the data generated by a user service such as File Transfer Protocol (FTP) and Voice over Internet Protocol (VoIP), to transfer the processed data to the multiplexer/demultiplexer 1020, to process the data from the multiplexer/demultiplexer 1020, and to deliver the processed data to the service application running on the higher layer.

The controller 1010 controls the transceiver by taking notice of the CSI/SRS transmission timing of the UE.

The scheduler 1015 allocates transmission resource to the UE at an appropriate time in consideration of the buffer status of the UE, channel status, and active time of the UE; and controls the transceiver to process the signals transmitted by the UE or to be transmitted to the UE.

As described above, the cell search method and apparatus of exemplary embodiments of the present invention is capable of performing the cell search procedure to appropriate eNBs, resulting in improvement of network attachment efficiency.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selecting/reselecting a cell by a terminal in a mobile communication system, the method comprising:
   receiving system information including a set of physical cell identities reserved for closed subscriber group (CSG) cells;
   determining whether the terminal is in an any cell selection state; and
   selecting a first cell among a plurality of cells including the CSG cells if the terminal is in the any cell selection state;
   wherein the terminal is in the any cell selection state, if the terminal fails finding a suitable cell or is rejected by a selected public land mobile network (PLMN).

2. The method of claim 1, further comprising:
   selecting a second cell among the plurality of cells with an exception of the CSG cells if the terminal is not in the any cell selection state.

3. The method of claim 1, further comprising:
   starting, if the system information is received, a timer having a length of a first time duration; and
   selecting a second cell among the plurality of cells with an exception of the CSG cells before the timer expires.

4. The method of claim 1, wherein the set of physical cell identities is included in a csg-PhysCellIdRange parameter of the system information.

5. A terminal for selecting/reselecting a cell in a mobile communication system, the terminal comprising:
   a transceiver configured to transmit and receive signals to and from a base station; and
   a controller configured to:
     receive system information including a set of physical cell identities reserved for closed subscriber group (CSG) cells,
     determine whether the terminal is in an any cell selection state, and
     select a first cell among a plurality of cells with an exception of the CSG cells if the terminal is in the any cell selection state based on the determination,
   wherein the terminal is in the any cell selection state if the terminal fails finding a suitable cell or is rejected by a selected public land mobile network (PLMN).

6. The terminal of claim 5, wherein the controller is further configured to select a second cell among the plurality of cells with an exception of the CSG cells if the terminal is not in the any cell selection state.

7. The terminal of claim 5, wherein the controller is further configured to:
   select, if the system information is received, a timer having a length of a first time duration, and
   select a second cell among the plurality of cells with an exception of the CSG cells before the timer expires.

8. The terminal of claim 5, wherein the set of physical cell identities is included in a csg-PhysCellIdRange parameter of the system information.

9. A method for selecting/reselecting a cell by a terminal in a mobile communication system, the method comprising:
   receiving first system information including a set of physical cell identities reserved for closed subscriber group (CSG) cells on a first cell;
   receiving second system information including public land mobile network (PLMN) information on a second cell;
   determining whether a PLMN identity of the first cell and a PLMN identity of the second cell is different based on the PLMN information; and
   selecting a cell among a plurality of cells including the CSG cells if the PLMN of the first cell and the PLMN of the second cell is different.

10. The method of claim 9, further comprising:
    selecting a cell among the plurality of cells with an exception of the CSG cells if the PLMN of the first cell and the PLMN of the second cell is identical.

11. A terminal for selecting/reselecting a cell by a terminal in a mobile communication system, the terminal comprising:
    a transceiver configured to transmit and receive signals to and from a base station; and a controller configured to:
receive first system information including a set of physical cell identities reserved for closed subscriber group (CSG) cells on a first cell,
receive second system information including public land mobile network (PLMN) information on a second cell,
determine whether a PLMN identity of the first cell and a PLMN identity of the second cell is different or not based on the PLMN information, and
to select a cell among a plurality of cells including the CSG cells if the PLMN of the first cell and the PLMN of the second cell is different.

12. The terminal of claim 11, wherein the controller is further configured to select a cell among the plurality of cells with an exception of the CSG cells if the PLMN of the first cell and the PLMN of the second cell is identical.

* * * * *